United States Patent [19]

Fukui et al.

[11] Patent Number: 5,250,866
[45] Date of Patent: Oct. 5, 1993

[54] STRUCTURE FOR FIXING PERMANENT MAGNETS IN MOTOR

[75] Inventors: Masashi Fukui, Ashikaga; Takayoshi Sakamoto, Tatebayashi, both of Japan

[73] Assignee: Mitsuba Electric Mfg. Co., Ltd., Gunma, Japan

[21] Appl. No.: 884,193

[22] Filed: May 18, 1992

[30] Foreign Application Priority Data

May 24, 1991 [JP] Japan ................... 3-46968[U]

[51] Int. Cl.⁵ ............... H02K 21/26; H02K 21/38; H02K 23/04
[52] U.S. Cl. ................................................. 310/154
[58] Field of Search ............... 310/154, 89, 238, 259, 310/258, 216, 51

[56] References Cited

U.S. PATENT DOCUMENTS

| | | | |
|---|---|---|---|
| 4,636,107 | 1/1987 | Casler et al. | 310/154 X |
| 4,795,932 | 1/1989 | Long | 310/154 |
| 4,851,727 | 7/1989 | Tanaka | 310/154 |

FOREIGN PATENT DOCUMENTS 1477233 4/1966 France.

Primary Examiner—Emanuel T. Voeltz
Attorney, Agent, or Firm—Oliff & Berridge

[57] ABSTRACT

A fixing structure of the present invention is capable of fixing permanent magnets to an internal peripheral surface of a cylindrical yoke in a short time without producing a positional deviation. The fixing structure has magnet receiving pieces which are projected on the internal peripheral surface of an internal cylinder, and magnet holders each having elastically deformable magnet pressure pieces formed therein, so that permanent magnets are respectively held between the elastically deformed magnet pressure pieces and the magnet receiving pieces and pressed against the side of the magnet receiving pieces in a normal direction due to the elastic restoring force on the magnet pressure pieces. The permanent magnets can thus be integrally fixed to the internal peripheral surface of the internal cylinder.

21 Claims, 5 Drawing Sheets

5,250,866

STRUCTURE FOR FIXING PERMANENT MAGNETS IN MOTOR

BACKGROUND OF THE INVENTION

1. Field of the Invention

The present invention relates to a structure for fixing permanent magnets in a motor used in vehicle electrical equipment or the like.

2. Description of the Related Art

In a motor used, for example, in vehicle electrical equipment, a thermosetting adhesive is generally used for fixing permanent magnets to an internal peripheral surface of a motor yoke made of a ferromagnetic substance. However, in this case, a long period of time is required for hardening of the adhesive and the permanent magnets sometimes slip in the course of hardening of the adhesive. The motor using such an adhesive also has a problem with respect to the danger that the permanent magnet is broken due to the thermal stress acting thereon during generation of heat in the motor.

A method of fixing permanent magnets to the internal peripheral surface of a yoke using a separate mounting member is thus proposed. However, this method has not only the problem that it is troublesome and complicated to position the permanent magnets but also the problem that it is difficult to precisely mount the permanent magnets without producing looseness. Thus, this method cannot be immediately employed.

SUMMARY OF THE INVENTION

An object of the present invention is to provide a structure for fixing permanent magnets in a motor which has none of the above problems.

In order to achieve the object, the present invention provides a fixing structure comprising a pair of right and left magnet receiving pieces projected on an internal peripheral surface of an inner cylindrical yoke, and magnetic holders each having elastically deformable magnet pressure pieces formed at right and left sides in a peripheral direction of the magnetic holders, wherein when permanent magnets are integrally fixed to the internal peripheral surface of the yoke, a pair of right and left permanent magnets are respectively held between the right and left elastically deformed magnet pressure pieces of each of the magnet holders and the magnet receiving pieces and are normally pressed against the side of the magnet receiving pieces due to an elastic restoring force acting on the magnet pressure pieces so that the permanent magnets can be integrally fixed to the internal peripheral surface of the yoke.

The present invention configured as described above is capable of fixing permanent magnets to the internal peripheral surface of a yoke in a short time without deviation of the positions of the magnets.

BRIEF DESCRIPTION OF THE DRAWINGS

The invention will be described in detail with reference to the following figures, wherein.

DESCRIPTION OF THE PREFERRED EMBODIMENTS

Figure 1:
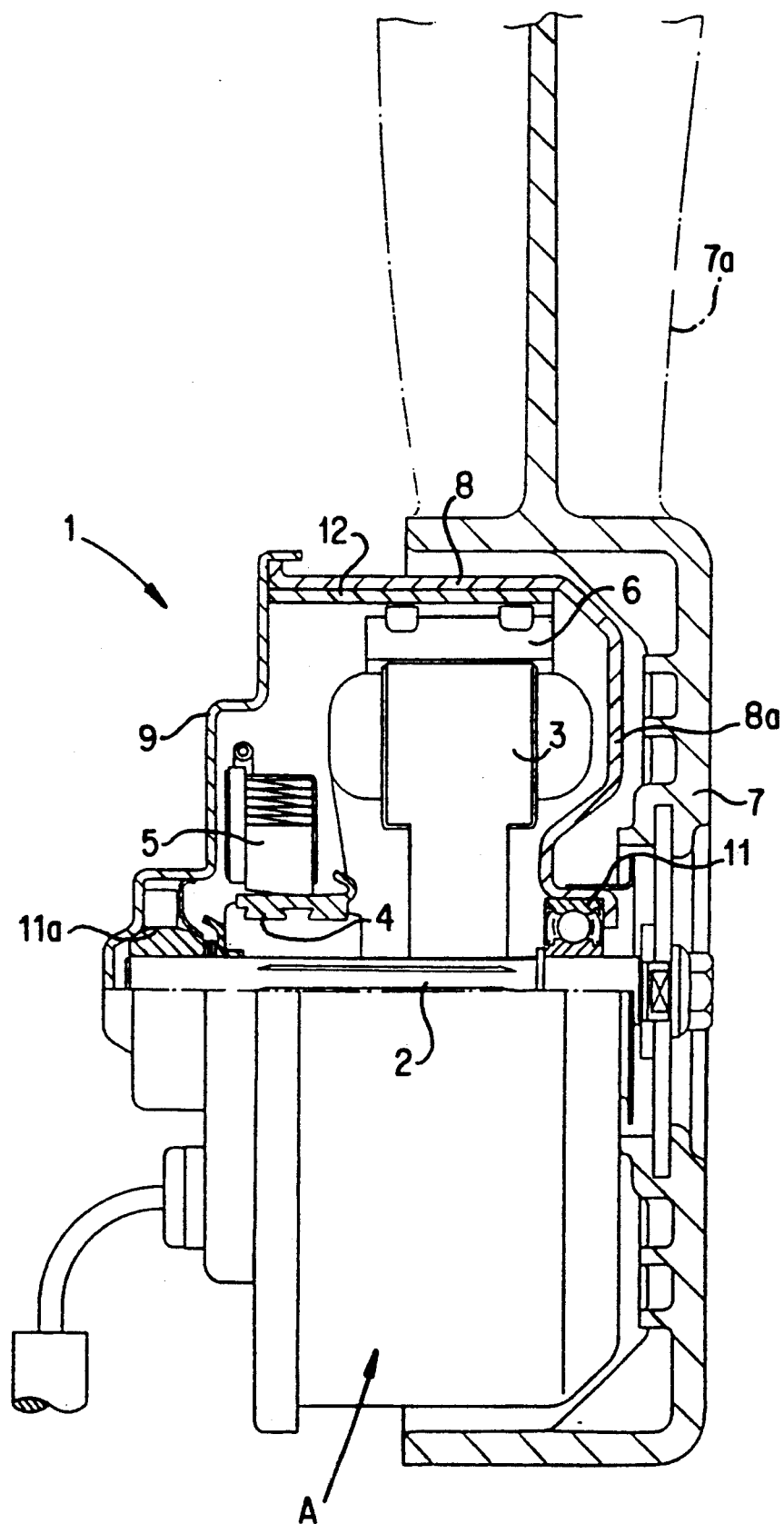
FIG. 1 is a sectional view of the motor.
Figure 2:
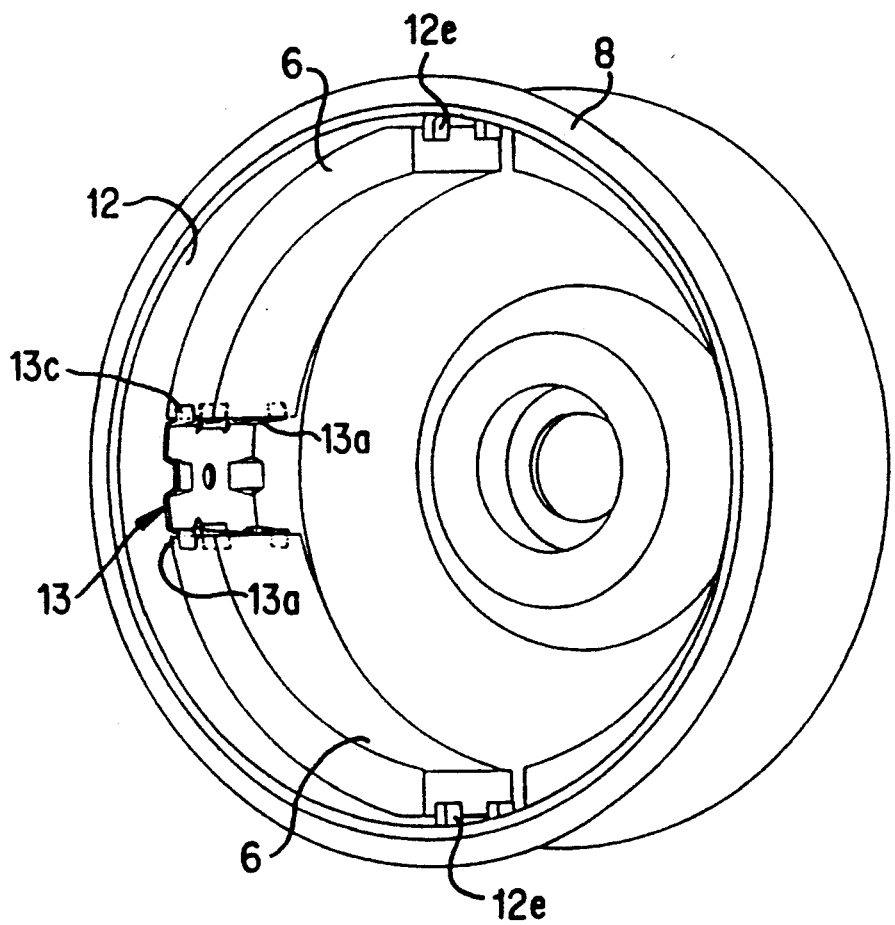
FIG. 2 is a perspective view of an external cylinder in the state where an internal cylinder and permanent magnets are incorporated.
Figure 3:
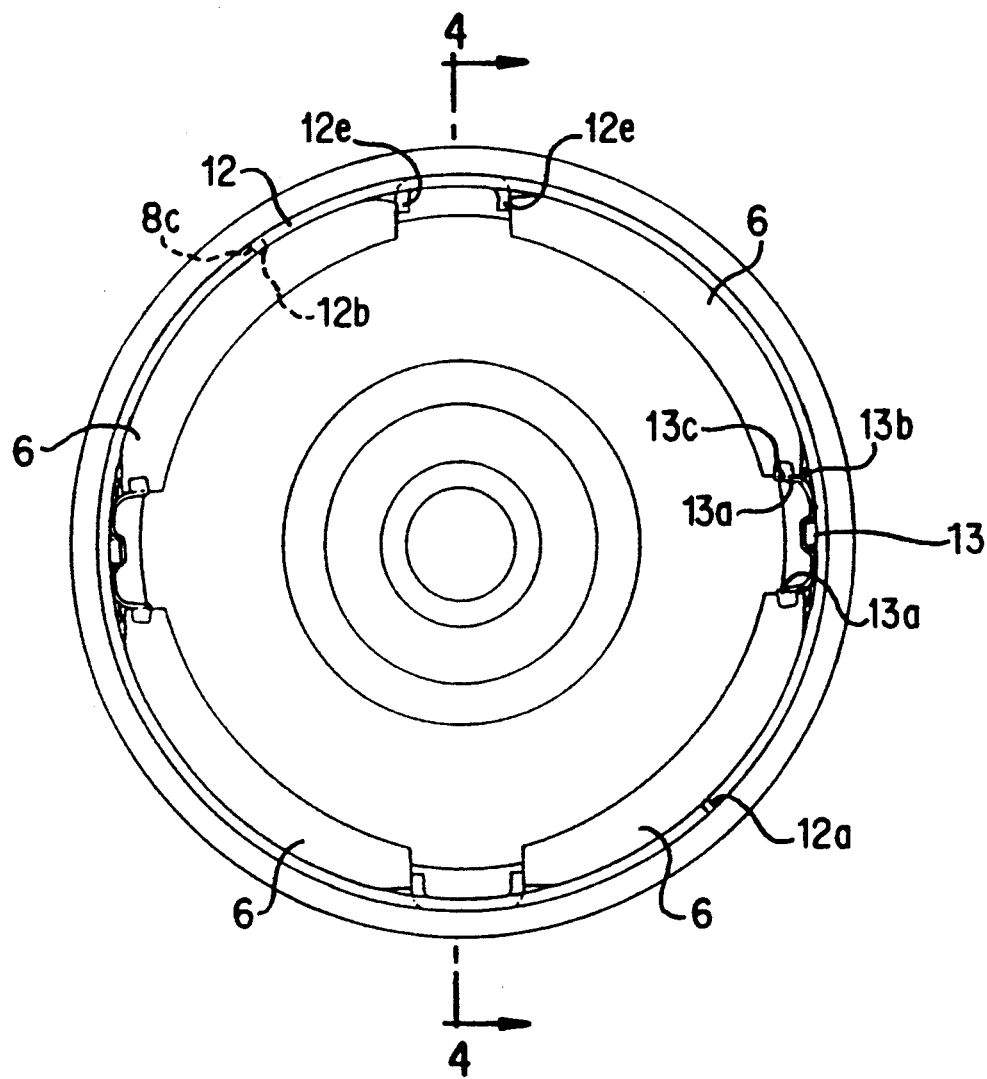
FIG. 3 is a front view of the external cylinder shown in FIG. 2.

An embodiment of the present invention is described below with reference to the drawings. In the drawings, reference numeral denotes a fan motor 1 comprising members such as the casing A described below, a motor shaft 2, a rotor core 3, a commutator 4, a brush 5, four permanent magnets 6 and so on. A fan boss portion 7 having a plurality of blades 7a which are formed thereon is integrally mounted at one end of the motor shaft 2 projected from the casing A, as in a conventional motor.

The casing A is assembled by integrally fixing an external cylinder 8 having a cylindrical form with a bottom to an end bracket 9 for covering the open end of the external cylinder 8. Both the external cylinder 8 and the end bracket 9 are made of aluminum which is a nonmagnetic substance. One end of the motor shaft 2 and the other end thereof are rotatably supported by the bottom portion 8a of the external cylinder 8 and the end bracket 9 through bearings 11 and 11a, respectively.

Figure 4:
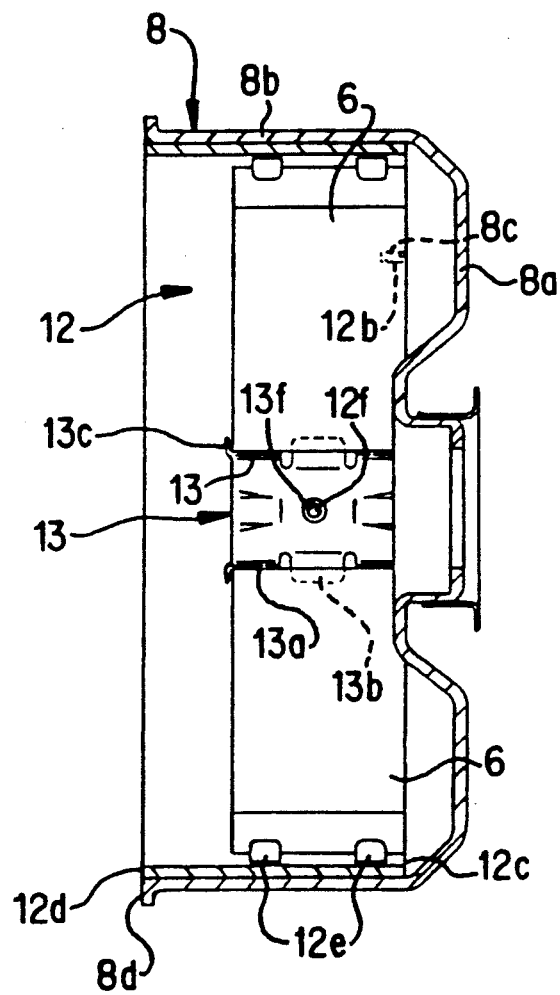
FIG. 4 is a sectional view taken along a line X—X in FIG. 3.
Figure 5:
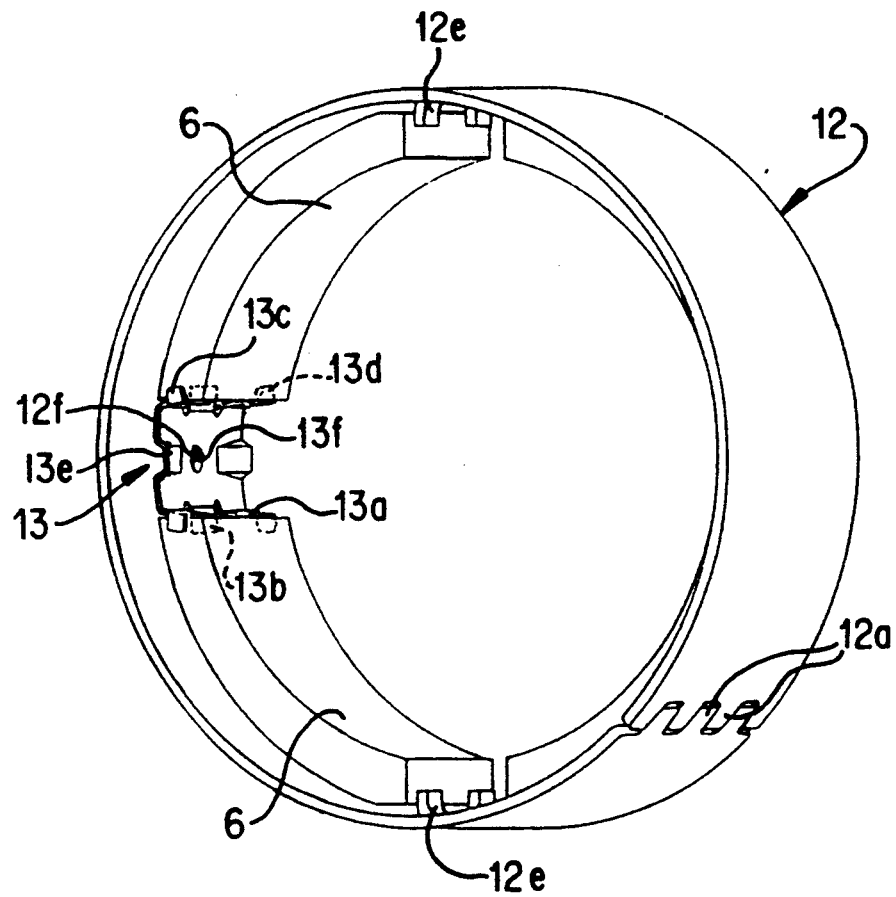
FIG. 5 is a perspective view of the internal cylinder shown in FIG. 2.

On the other hand, reference numeral 12 denotes a yoke in the form of an internal cylinder which is formed in a cylindrical shape by bending a plate so that the diameter thereof can be elastically increased and decreased and which is made of iron which is a ferromagnetic substance. As illustrated in FIG. 5, both ends 12a of a plate which forms the cylinder 12 are irregularly notched so as to be engageable with each other. Both ends 12a engaged with each other in a rack like fashion. This causes the both ends 12a to go into and out of engagement with each other when the diameter of the internal cylinder 12 is increased and decreased. The internal cylinder 12 also has an outer diameter which is set so as to be substantially the same as or slightly smaller than the inner diameter of the cylindrical portion 8b (FIG. 4) of the external cylinder 8 in a natural state, whereby the internal cylinder 12 can be inserted into the cylindrical portion 8b of the external cylinder 8.

A positioning projection 8c and a slit 12b are formed in the cylindrical portion 8b and the internal cylinder 12, respectively, so that the internal cylinder 12 is positioned in the peripheral direction of the outer cylinder 8. The internal cylinder 12 is also positioned in the axial direction of the external cylinder 8 by inserting the internal cylinder in such a manner that the insertion leading edge 12c of the internal cylinder 12 is butted to the corner portion formed by the bottom portion 8a and the cylindrical portion 8b, and the insertion trailing edge 12d thereof is placed on the same plane as that of the open edge 8d of the cylindrical portion 8b.

Although, in this embodiment, the outer diameter of the internal cylinder 12 is set to a value substantially the same as or slightly smaller than the inner diameter of the cylindrical portion 8b in a natural state so that the internal cylinder can be easily inserted into the cylindrical portion 8b, the internal cylinder 12 is not limited to this. For example, the outer diameter of the internal cylinder 12 may be set to a value greater than that of the inner diameter of the cylindrical portion 8b in a natural state so that the internal cylinder 12 is forced to be decreased in diameter and inserted into the cylindrical portion 8b. This causes the internal cylinder 12 to be integrally fixed to the internal periphery of the cylindrical portion 8b, without being separated therefrom and rotated therein, due to the elastic restoring force acting on the internal cylinder 12, which is caused by release of the cylinder contraction state. Alternatively, the internal cylinder may be initially formed in a cylindrical shape and then forced to be inserted into the cylindrical portion 8b of the external cylinder 8 under pressure. In addition, in this embodiment, both edges of a plate of the internal cylinder 12 are formed into an irregular shape and are butted to each other in the state that they are engaged with each other so that influences on the formation of a magnetic path are decreased as much as possible. However, the internal cylinder is not limited to this, and both ends thereof may be, of course, butted to each other in any one of other various states such as an inclined state, a linear state and the like.

Reference numeral 13 denotes magnet holders for fixing the permanent magnets 6 to the internal peripheral surface of the internal cylinder 12. Each of the magnet holders 13 has a pair of right and left magnet pressure pieces 13a which are formed by cutting and raising each holder at either end in the circumferential direction thereof. The internal cylinder 12 has a pair of right and left magnet receiving pieces 12e which are formed by cutting and raising the cylinder 12 at positions deviating from each other by 180 degrees. A pair of right and left magnets 6 are respectively brought into contact with the right and left pressure pieces 13a in the state where the right and left magnet pressure pieces 13a are elastically deformed by holding both sides so as to be close to each other. In this state, when the magnet holders 13 are inserted into the internal cylinder 12 together with the permanent magnets 6, and the holding of the right and left magnet pressure pieces 13a is then released, the magnet pressure pieces 13a are apt to be restored to a natural state, and the right and left permanent magnets 6 are respectively normally elastically pressed against the sides of the magnet receiving pieces 12e due to an elastic restoring force. This causes the right and left permanent magnets 6 to be integrally fixed to the internal cylinder 12 in the state where the magnets 6 are locked and positioned by the magnet receiving pieces 12e without using any adhesive. In addition, since the elastic restoring force on the magnetic holders 13 acts in the direction in which the diameter of the internal cylinder 12 inserted into the cylindrical portion 8b is increased, the internal cylinder 12 can be elastically contracted or expanded in correspondence with the internal diameter of the cylindrical portion 8b.

Each of the magnet holders 13 has separation preventing pieces 13b for preventing the magnet holders 13 from separating from the magnets 6 in the direction of the inner diameter, and movement preventing pieces 13c, 13d for preventing the permanent magnets 6 from axially moving relative to the magnet holders 13. In this embodiment, the position of engagement between both ends 12a of a plate which forms the internal cylinder 12 is set at the substantially central position of the permanent magnet 6 selected from the four permanent magnets 6 in the peripheral direction of the internal cylinder 12. Each of the magnet holders 13 is provided with a guide groove 13e and a positioning hole 13f, and positioning projections 12f are formed on the inner peripheral surface of the internal cylinder 12. When the magnet holders 13 are incorporated into the internal cylinder 12, the magnetic holders 13 are pushed in the internal cylinder 12 while being guided by the guide grooves 13e until the positioning projections 12f are respectively engaged with the positioning holes 13f so that the magnet holders 13 are positioned.

Although, in this embodiment, the magnet receiving pieces 12e of the internal cylinder 12 are formed by cutting and raising it, the magnet receiving pieces 12e may be formed by appropriate means such as embossing, welding or the like.

In the embodiment of the present invention configured as described above, when the permanent magnets 6 are fixed to the internal cylinder 12, a pair of right and left permanent magnets 6 are respectively put on the right and left magnet pressure pieces 13a of each of the magnet holders 13 in the state where the magnet pressure pieces 13a are elastically deformed so as to be close to each other, and the magnet holders 13 in this state are then inserted into the internal cylinder 12 together with the permanent magnets 6. When holding of both magnet pressure pieces 13a is then released, the elastic restoring force acting on the magnet pressure pieces 13a causes the right and left permanent magnets 6 to be normally elastically pressed on the side of the right and left magnet receiving pieces 12e which are formed on the internal peripheral surface of the internal cylinder 12 by cutting and raising it. This causes the right and left permanent magnets 6 to be integrally fixed to the internal cylinder 12 in the state wherein the permanent magnets 6 are locked and positioned by the magnet receiving pieces 12e. As a result, it is not necessary to wait until an adhesive is hardened, as in a conventional method of fixing permanent magnets using an adhesive. It is also possible to avoid the problem of the positions of the permanent magnets deviating before the adhesive has hardened or of the permanent magnets breaking due to the generation of heat in a motor. It is thus possible to significantly reduce the time required for fixing the permanent magnets 6 to the external cylinder and to obtain a motor 1 of high quality.

In addition, in this embodiment, both the external cylinder 8 and the end bracket 9 which form the casing A are made of aluminum which is a non-magnetic substance, and only the internal cylinder 12 which is integrally inserted into the cylindrical portion 8b of the external cylinder 8 is made of iron which is a ferromagnetic substance. Thus, the iron internal cylinder 12 forms a magnetic path together with the permanent magnets 6, and an attempt can be made to reduce the weight of the whole motor 1 by forming the whole casing A using aluminum having a low specific gravity. The yoke position having the above-described cylinder structure for fixing the permanent magnets 6 is convenient and has no problem with respect to water leakage even if the magnet receiving pieces 12e are formed on the internal cylinder 12 by cutting and raising it.

In the present invention configured as described above, when the permanent magnets are fixed to the internal peripheral surface of the yoke, a pair of right and left permanent magnets are respectively held between the right and left magnet pressure pieces formed at both sides of each of the magnet holders, and the right and left magnet receiving pieces are projected on the internal peripheral surface of the yoke in the state where the magnet pressure pieces are elastically deformed so as to be close to each other. The elastic restoring force on the elastically deformed magnet pressure pieces thus causes the right and left permanent magnets to be elastically pressed on the side of the magnet receiving pieces in the normal direction. This causes the right and left permanent magnets to be integrally fixed to the yoke in the state wherein the permanent magnets are locked and positioned by the magnet receiving pieces. As a result, it is no longer necessary to wait until an adhesive is hardened, as in a conventional method of fixing using an adhesive. It is also possible to avoid the problem of the positions of the permanent magnets deviating before the adhesive has hardened or the problem of the permanent magnets breaking due to the generation of heat from a motor. This enables an attempt to be made to reduce the time required for fixing the permanent magnets. Thus, a motor having high precision and high quality is obtained.

In addition, the double layer structure comprises an external cylinder made of a non-magnetic substance such as aluminum or the like and an internal cylindrical yoke inserted into the external cylindrical yoke and made of a ferromagnetic substance such as iron or the like so that the internal cylindrical yoke made of a ferromagnetic substance forms a magnetic path together with the permanent magnets, and an attempt can be made to reduce the total weight of the motor. When the magnet receiving pieces are formed on the internal cylindrical yoke to which the permanent magnets are fixed, the yoke is convenient and has no problem with respect to water leakage even if the magnet receiving pieces are formed by cutting and raising the internal cylindrical yoke.

While the invention has been described with reference to a particular preferred embodiment, the invention is not limited to the specific examples described above. It is evident that many alternatives, modifications and variations will be apparent to those skilled in the art.

Accordingly, the preferred embodiments of the invention as set forth herein are intended to be illustrative, not limiting. Various changes may be made without departing from the spirit and scope of the invention as defined in the following claims.

What is claimed is:

1. A structure for fixing permanent magnets in a motor, said structure comprising:
   at least one pair of first and second magnet receiving pieces projecting from an internal peripheral surface of a cylindrical yoke;
   at least one magnet holder having elastically deformable first and second magnet pressure pieces which are formed at first and second sides of said magnet holder in a peripheral direction of said structure; and
   at least one pair of first and second permanent magnets, the first and second permanent magnets being held respectively between said first and second magnet pressure pieces of said magnet holder and the first and second magnet receiving pieces, wherein said first and second permanent magnets are pressed respectively against sides of said first and said second magnet receiving pieces due to an elastic restoring force acting on said first and second magnet pressure pieces of said magnet holder, said at least one pair of permanent magnets and said at least one magnet holder being integrally fixed to the internal peripheral surface of said yoke.

2. The structure for fixing permanent magnets in a motor according to claim 1, wherein an external cylinder made of a non-magnetic substance is fixed on an outer peripheral surface of said yoke, said external cylinder and said yoke forming a double cylinder structure, said yoke being made of a ferromagnetic substance.

3. The structure for fixing permanent magnets in a motor according to claim 2, wherein said non-magnetic substance is aluminum.

4. The structure for fixing permanent magnets in a motor according to claim 2, wherein said yoke has an outer diameter which is one of slightly smaller than an inner diameter of said external cylinder and equal to the inner diameter of said external cylinder.

5. The structure for fixing permanent magnets in a motor according to claim 2, wherein said yoke has an outer diameter which is greater than an inner diameter of said external cylinder, the diameter of said yoke being decreasable to enable insertion of said yoke into said external cylinder.

6. The structure for fixing permanent magnets in a motor according to claim 2, wherein said external cylinder has a corner portion and an open edge and said yoke has an insertion leading edge and an insertion trailing edge, said insertion leading edge being butted to said corner portion and said insertion trailing edge being flush with said open edge.

7. The structure for fixing permanent magnets in a motor according to claim 2, wherein said yoke comprises a plate having two ends which engage one another at an engagement position, said engagement position being located at a substantially central position of one of the permanent magnets.

8. The structure for fixing permanent magnets in a motor according to claim 1, wherein said magnet receiving pieces comprise cut and raised cylinder portions which deviate 180° in position from each other.

9. The structure for fixing permanent magnets in a motor according to claim 1, wherein said magnet holders each have separation preventing pieces for preventing the magnet holders from separating from said magnets.

10. The structure for fixing permanent magnets in a motor according to claim 1, wherein said magnet holders each have movement preventing pieces for preventing the permanent magnets from axially moving relative to the magnet holders.

11. The structure for fixing permanent magnets in a motor according to claim 1, wherein each magnet holder has a positioning hole and said internal peripheral surface has positioning projections, said positioning projections engaging said positioning holes, a guide groove of each magnet holder guiding each magnet holder to a proper position.

12. A structure for fixing permanent magnets in a motor, said structure comprising:
   a cylindrical yoke having an internal peripheral surface;
   magnet receiving pieces projecting from said internal peripheral surface; and
   at least one magnet holder, each magnet holder located between a pair of said permanent magnets, each said magnet holder comprising elastically deformable magnet pressure pieces formed at opposite sides of said magnet holder, said magnet pressure pieces and a plurality of said magnet receiving pieces cooperating to hold said pair of permanent magnets therebetween such that at least one pair of said permanent magnets and said at least one magnet holder are integrally fixed to the internal peripheral surface of said cylindrical yoke.

13. The structure for fixing permanent magnets in a motor according to claim 12, wherein an external cylinder made of a non-magnetic substance is fixed to an outer peripheral surface of said yoke, said external cylinder and said yoke forming a double cylinder structure, said yoke being made of a ferromagnetic substance.

14. The structure for fixing permanent magnets in a motor according to claim 13, wherein said non-magnetic substance is aluminum.

15. The structure for fixing permanent magnets in a motor according to claim 13, wherein said yoke has an outer diameter which is one slightly smaller than an inner diameter of said external cylinder and equal to the inner diameter of said external cylinder.

16. The structure for fixing permanent magnets in a motor according to claim 13, wherein said yoke has an outer diameter which is greater than an inner diameter of said external cylinder, the diameter of said yoke being decreasable to enable insertion of said yoke into said external cylinder.

17. The structure for fixing permanent magnets in a motor according to claim 13, wherein said external cylinder has a corner portion and an open edge and said yoke has an insertion leading edge and an insertion trailing edge, said insertion leading edge being butted to said corner portion and said insertion trailing edge being flush with said open edge.

18. The structure for fixing permanent magnets in a motor according to claim 13, wherein said yoke comprises a plate having two ends which engage one another at an engagement position, said engagement position being located at a substantially central position of one of the permanent magnets.

19. The structure for fixing permanent magnets in a motor according to claim 12, wherein said magnet receiving pieces comprise cut and raised cylinder portions which deviate 180° in position from each other.

20. The structure for fixing permanent magnets in a motor according to claim 12, wherein said magnet holders each have separation preventing pieces for preventing the magnet holders from separating from said magnets.

21. The structure for fixing permanent magnets in a motor according to claim 12, wherein said magnet holders each have movement preventing pieces for preventing the permanent magnets from axially moving relative to the magnet holders.

* * * * *